(12) United States Patent
Cheng et al.

(10) Patent No.: US 7,916,466 B2
(45) Date of Patent: Mar. 29, 2011

(54) COMPUTER ENCLOSURE WITH INPUT/OUTPUT MODULE

(75) Inventors: Xue-Li Cheng, Shenzhen (CN);
Qing-Zhi Yang, Shenzhen (CN);
Guang-Yao Lee, Taipei Hsien (TW);
Xiao-Zhong Jing, Shenzhen (CN);
Hsuan-Tsung Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 73 days.

(21) Appl. No.: 12/430,059

(22) Filed: Apr. 24, 2009

(65) Prior Publication Data
US 2010/0156255 A1 Jun. 24, 2010

(30) Foreign Application Priority Data
Dec. 24, 2008 (CN) .......................... 2008 1 0306505

(51) Int. Cl.
*H05K 5/00* (2006.01)
*H05K 7/00* (2006.01)

(52) U.S. Cl. ................................ 361/679.4; 361/679.43
(58) Field of Classification Search ............... 361/679.4, 361/679.42, 679.43, 679.45
See application file for complete search history.

(56) References Cited

U.S. PATENT DOCUMENTS

| | | | | |
|---|---|---|---|---|
| 6,335,859 B1 * | 1/2002 | Chuang | .................... | 361/679.33 |
| 6,344,968 B2 * | 2/2002 | Kim et al. | ................ | 361/679.22 |
| 6,662,405 B2 * | 12/2003 | Vitry | ................................ | 16/355 |
| 7,200,002 B2 * | 4/2007 | Peng et al. | ................. | 361/679.4 |
| 7,367,638 B2 * | 5/2008 | Marroquin et al. | ........... | 312/322 |

* cited by examiner

*Primary Examiner* — Jayprakash N Gandhi
*Assistant Examiner* — Anthony M Haughton
(74) *Attorney, Agent, or Firm* — Zhigang Ma

(57) ABSTRACT

A computer enclosure includes an inner chassis, an input/output (I/O) module defining a number of I/O interfaces, a latching unit attached to the inner chassis, a resilient member connected between the I/O module and the inner chassis, a gear rack attached to the I/O module, and a damping gear assembly attached to the inner chassis and engaging with the gear rack. The I/O module is pivotably mounted to the inner chassis. The latching unit is capable of keeping the I/O module at a closed position where the I/O interfaces of the I/O module are unexposed. A movement of the I/O module is restrained by the damping gear.

18 Claims, 5 Drawing Sheets

COMPUTER ENCLOSURE WITH INPUT/OUTPUT MODULE

BACKGROUND

1. Technical Field

The present invention relates to computer enclosures, and more particularly to a computer enclosure with an input/output (I/O) module.

2. Description of Related Art

A computer generally includes a plurality of I/O interfaces. For convenient maintenance, the plurality of I/O interfaces is popularly integrated to an I/O module which is movably attached to a chassis of the computer, with a spring connected between the I/O module and the chassis. For protecting the plurality of I/O interfaces from dust, the plurality of I/O interfaces of the I/O module is often shielded in the chassis when the plurality of I/O interfaces is unused. When peripheral devices, such as USB devices, are required to be connected to the computer via the plurality of I/O interfaces, the spring is restored to drive the I/O module to expose the plurality of I/O interfaces.

However, the spring is generally restored so quickly that the I/O module heavily impacts the chassis. Therefore, a noise is emitted during the movement of the I/O module, and the I/O module and a relative part of the chassis tend to be damaged.

DETAILED DESCRIPTION

Figure 1:
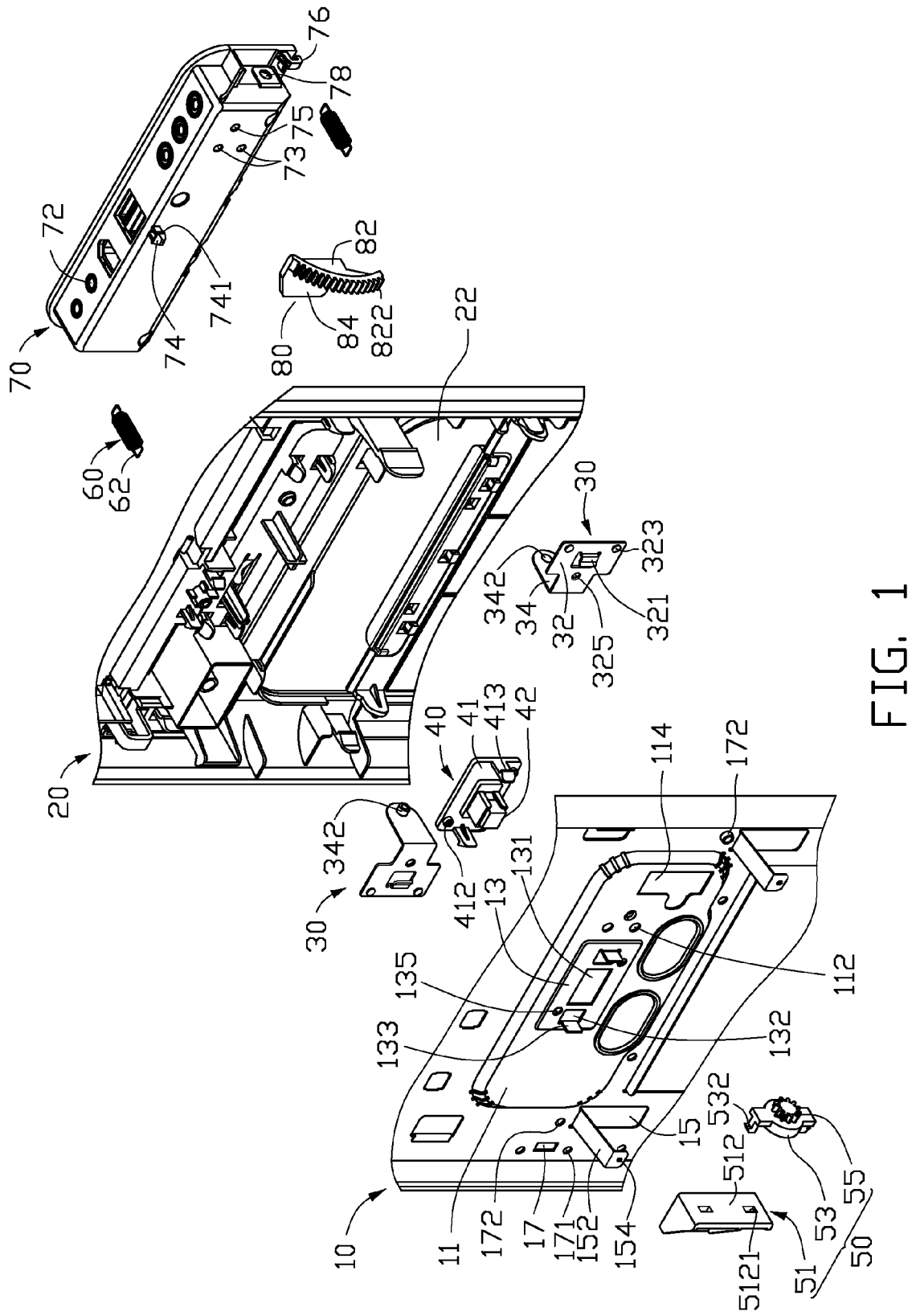
FIGS. 1 and 2 are exploded, isometric views of an exemplary embodiment of a computer enclosure, but viewed from different perspectives, the computer enclosure includes an I/O module.
Figure 2:
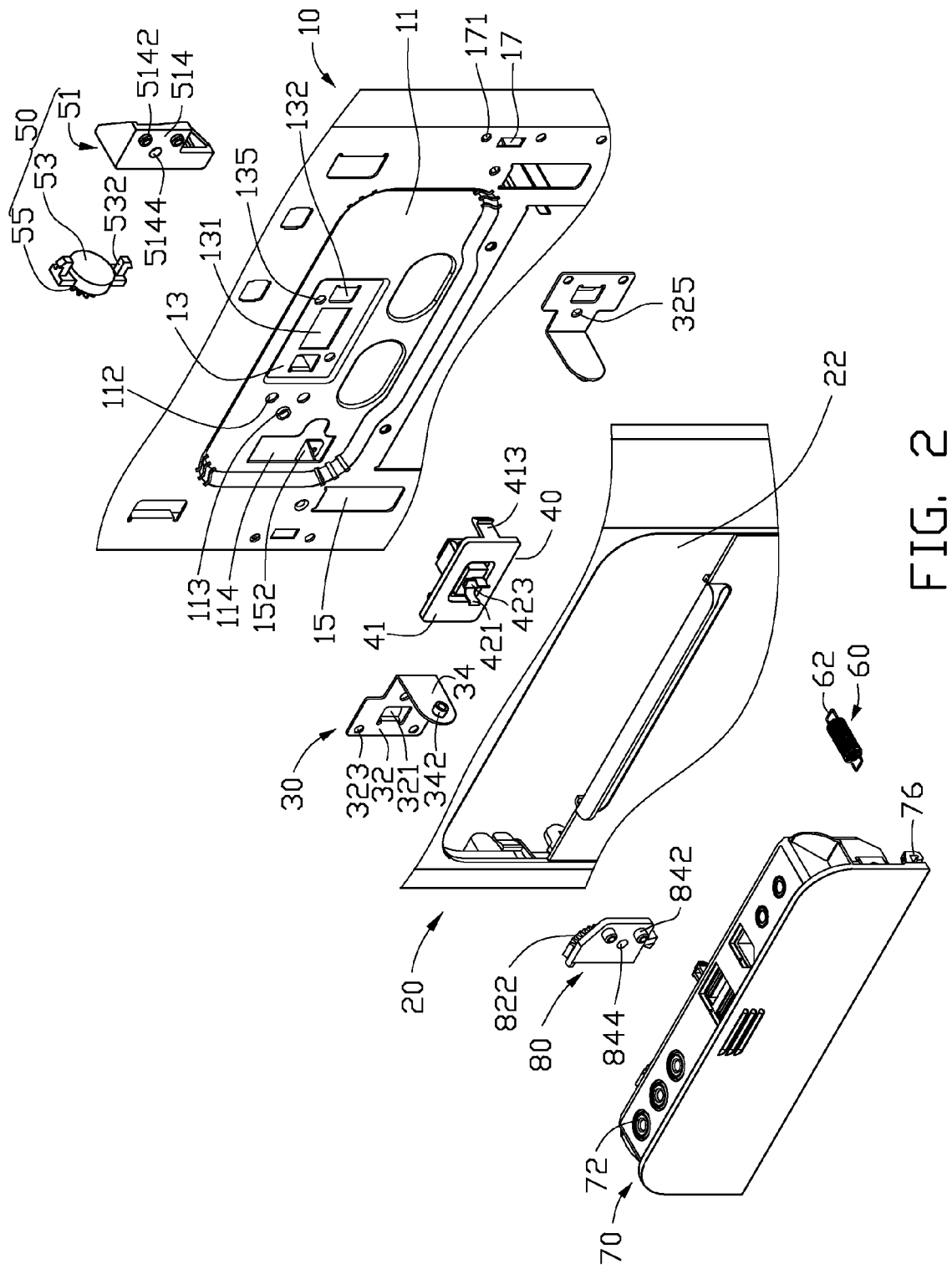

Referring to FIGS. 1 and 2, an exemplary embodiment of a computer enclosure includes an inner chassis 10, a front bezel 20, two mounting brackets 30, a latching unit 40, a damping gear assembly 50, two resilient members 60, an input/output (I/O) module 70, and a gear rack 80. The inner chassis 10 is configured to enclose a plurality of electronic components, such as a printed circuit board, a hard disk drive, and so on.

The inner chassis 10 defines a first housing portion 11, to receive the I/O module 70. Two openings 15 are defined in the inner chassis 10, adjacent to opposite ends of the housing portion 11 correspondingly. Two L-shaped fixing supports 152 extend inwards from top edges bounding the two openings 15. Each of the fixing supports 152 is L-shaped and includes an elongated portion perpendicularly connected to the inner chassis 10, and an end portion perpendicularly extending downwards from a distal end of the elongated portion. Each of the end portions defines a hooking hole 154. The inner chassis 10 defines two retaining holes 17 adjacent to opposite ends of the housing portion 11. Two positioning holes 171 are defined in the inner chassis 10 at the top end and the bottom end of each retaining hole 17. Two inner-threaded posts 172 extend inwards from the inner chassis 10, and arranged near the fixing supports 152, correspondingly. A bottom of the housing portion 11 defines a recessed portion 13, two positioning holes 112 close to an end of the housing portion 13, and a T-shaped interference-avoiding hole 114 adjacent to the positioning holes 112. An inner-threaded post 113 extends outwards from the bottom of the housing portion 11, and disposed between the positioning holes 112 and the interference-avoiding hole 114. A bottom of the housing portion 13 defines a rectangular opening 131, two mounting slots 132 adjacent to opposite ends of the opening 131, correspondingly, and two positioning holes 135 adjacent to the corresponding mounting slots 132, correspondingly. Two limiting members 133 extend inwards from edges bounding the corresponding mounting slots 132, correspondingly.

The front bezel 20 defines a rectangular opening 22 corresponding to the I/O module 70 and the housing portion 11 of the inner chassis 10.

Each of the mounting brackets 30 includes a mounting portion 32 and a supporting portion 34 perpendicularly extending from a first side of the mounting portion 32. An elastic locking portion 321 is formed on the mounting portion 32, corresponding to one of the retaining hole 17 of the inner chassis 10. Two positioning columns 323 extend from a second side opposite to the first side of the mounting portion 32, corresponding to two positioning holes 171. A fixing hole 325 is defined in the mounting portion 32, corresponding to one of the posts 172. A pivot shaft 342 extends from a distal end of each supporting portion 34, opposite to the mounting portion 32.

The latching unit 40 includes a frame 41 and a locking member 42. Two positioning columns 412 corresponding to the positioning holes 135 of the inner chassis 10, and two elastic clips 413 corresponding to the limiting members 133 of the inner chassis 10 extend from the frame 41. The locking member 42 includes two arc-shaped clamping portions 421 facing each other, and an actuator 423 disposed between the clamping portions 421. When the actuator 423 is actuated, the clamping portions 421 opens away from each other. When the actuator 423 is actuated again, the clamping portions 421 closes towards each other.

The damping gear assembly 50 includes a mount 51, a base 53, and a damping gear 55 rotatably attached to the base 53. A damping gear is a kind of gear that provides a damping force in rotation, the damping force increases with increasing rotational speed of the damping gear. The mount 51 includes a first plate 512 and a second plate 514 perpendicularly extending from a side of the first plate 512. The first plate 512 defines two fixing holes 5121. Two positioning columns 5142 extends from a surface of the second plate 514 perpendicular to the first plate 512, corresponding to the positioning holes 112 of the inner chassis 10. A fixing hole 5144 is defined in the second plate 514 corresponding to the post 113 of the inner chassis 10. The base 53 is circular, with two hooks 532 extending from opposite sides of the base 53, corresponding to the fixing holes 5121 of the mount 51 and opposite to the damping gear 55.

In the present embodiment, each of the resilient members 60 is a coil spring with two hooks 62 formed at opposite ends of the resilient member 60.

The I/O module 70 is a rectangular block with a plurality of I/O interfaces 72 defined in a top surface of the I/O module 70. A tongue 74 extends from an inner surface of the I/O module 70 perpendicular to the top surface of the I/O module 70. Two positioning holes 73 and a screw hole 75 are defined in the inner surface of the I/O module 70. A pair of wedged portions 741 is formed at a distal end of the tongue 74. Each of opposite ends of the I/O module 70 forms a retaining portion 76, and defines a pivot hole 78. The retaining portion 76 is adjacent to a bottom surface opposite to the top surface of the I/O module 70.

The gear rack 80 includes a curved engaging portion 82, and a mounting portion 84 perpendicularly extending from a radius of the engaging portion 82. A plurality of teeth 822 is formed on an arc rim of the engaging portion 82, and capable of engaging with the damping gear 55. Two positioning columns 842 extend from the mounting portion 84, opposite to the engaging portion 82 and corresponding to the positioning holes 73 of the I/O module 70. A fixing hole 844 corresponding to the screw hole 75 of the I/O module 70 is defined in the mounting portion 84.

Referring FIGS. 1 to 5, in assembly, the mounting brackets 30 are attached to the inner chassis 10, with the locking portions 321 correspondingly engaged in the retaining holes 17, and the positioning columns 323 correspondingly engaged in the positioning holes 171 of the inner chassis 10. As a result, the fixing holes 325 of the mounting brackets 30 are aligned with the posts 172 of the inner chassis 10, correspondingly, and two screws are inserted through the fixing holes 325 and engaged in the posts 172. Thus, the mounting brackets 30 are fixed to the inner chassis 10. The latching unit 40 is attached to an outside surface of the inner chassis 10, with the positioning columns 412 and the elastic clips 413 inserted into the positioning holes 135 and the mounting slots 132 of the inner chassis 10, correspondingly. The elastic clips 413 are engaged with the limiting members 133 to hold the latching unit 40 to the inner chassis 10. The locking member 42 of the latching unit 40 partially passes through the opening 131 of the inner chassis 10. The hooks 532 of the damping gear assembly 50 are engaged in the fixing holes 5121 of the mount 51. The damping gear assembly 50 is attached to an inside surface of the inner chassis 10, with the positioning columns 5142 engaged in the positing holes 112 of the inner chassis 10. A screw is inserted through the fixing hole 5144 of the mount 51 and engages in the post 113 of the inner chassis 10, thereby fixing the damping gear assembly 50 to the inner chassis 10. The damping gear 55 aligns with the interference-avoiding hole 114, and a pivoting shaft of the damping gear 55 is substantially parallel to the inner chassis 10.

The gear rack 80 is attached to the I/O module 70, with the positioning columns 842 of the gear rack 80 engaged in the positing holes 73 of the I/O module 70. A screw is inserted through the fixing hole 844 of the gear rack 80 and engages in the screw hole 75 of the I/O module 70, thereby fixing the gear rack 80 to the I/O module 70.

The I/O module 70 is placed between the mounting brackets 30, with the shafts 342 of the mounting brackets 30 rotatbly inserted into the pivot holes 78 of the I/O module 70, respectively. As a result, the I/O module 70 is rotatably mounted to the inner chassis 10 via the mounting brackets 30. The engaging portion 82 of the gear rack 80 passes through the interference-avoiding hole 114, with the teeth 822 of the engaging portion 82 meshed with the damping gear 55. Therefore, a damping mechanism including the damping gear 55 and the gear rack 80 is disposed between the I/O module 70 and the inner chassis 10, to restrict a rotational movement of the I/O module 70.

The resilient members 60 are respectively inserted into the openings 15 of the inner chassis 10. One of the two hooks 62 of each resilient member 60 is engaged with a corresponding retaining portion 76 and the other hook 62 of each resilient member 60 is engaged with the hooking hole 154 of a corresponding fixing support 152 of the inner chassis 10. The front bezel 20 is attached to the outside surface of the inner chassis 10, with the opening 22 of the front bezel 20 aligning with the I/O module 70.

Figure 3:
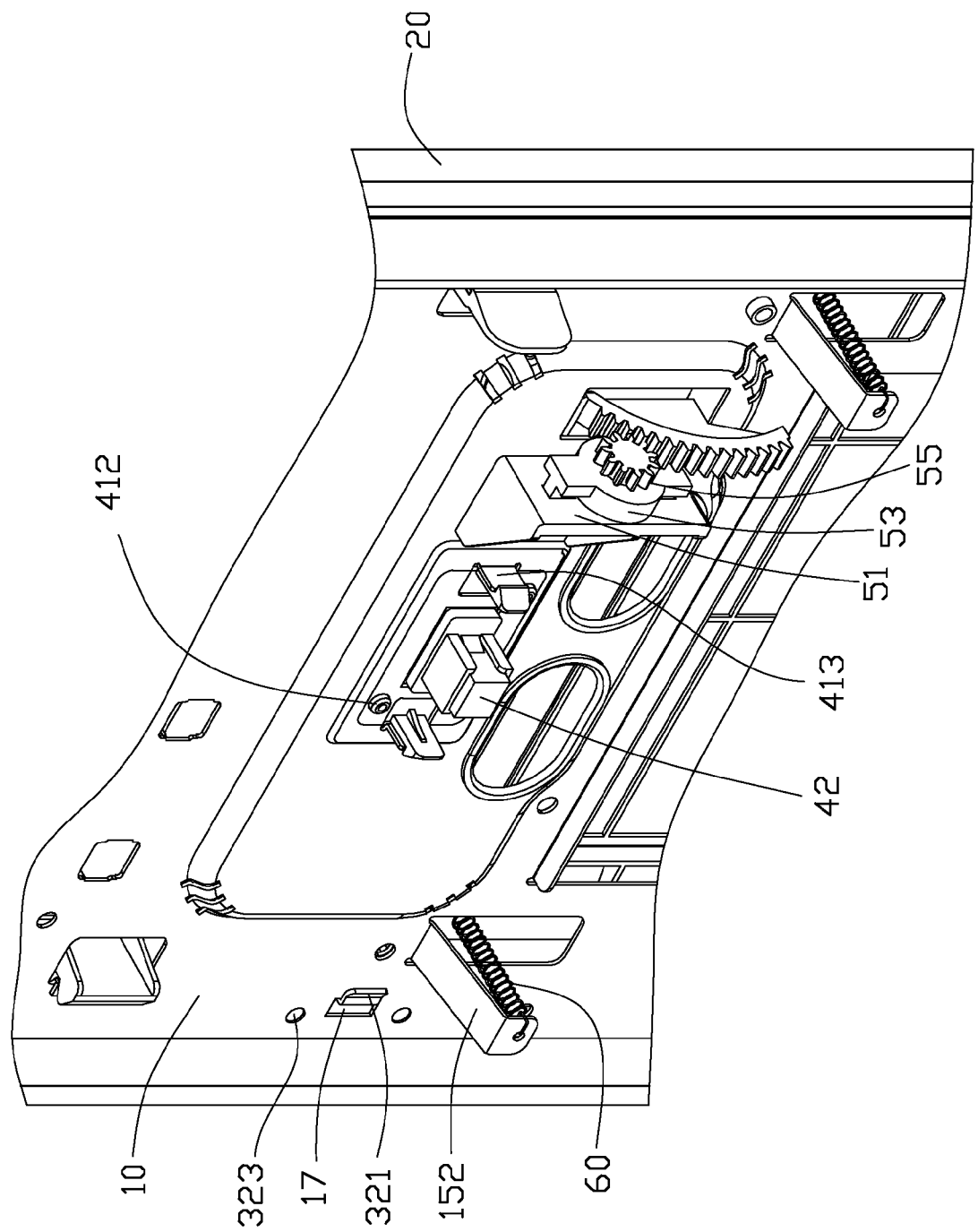
FIG. 3 is an assembled, isometric view of FIG. 1, showing the I/O module in a closed state.
Figure 4:
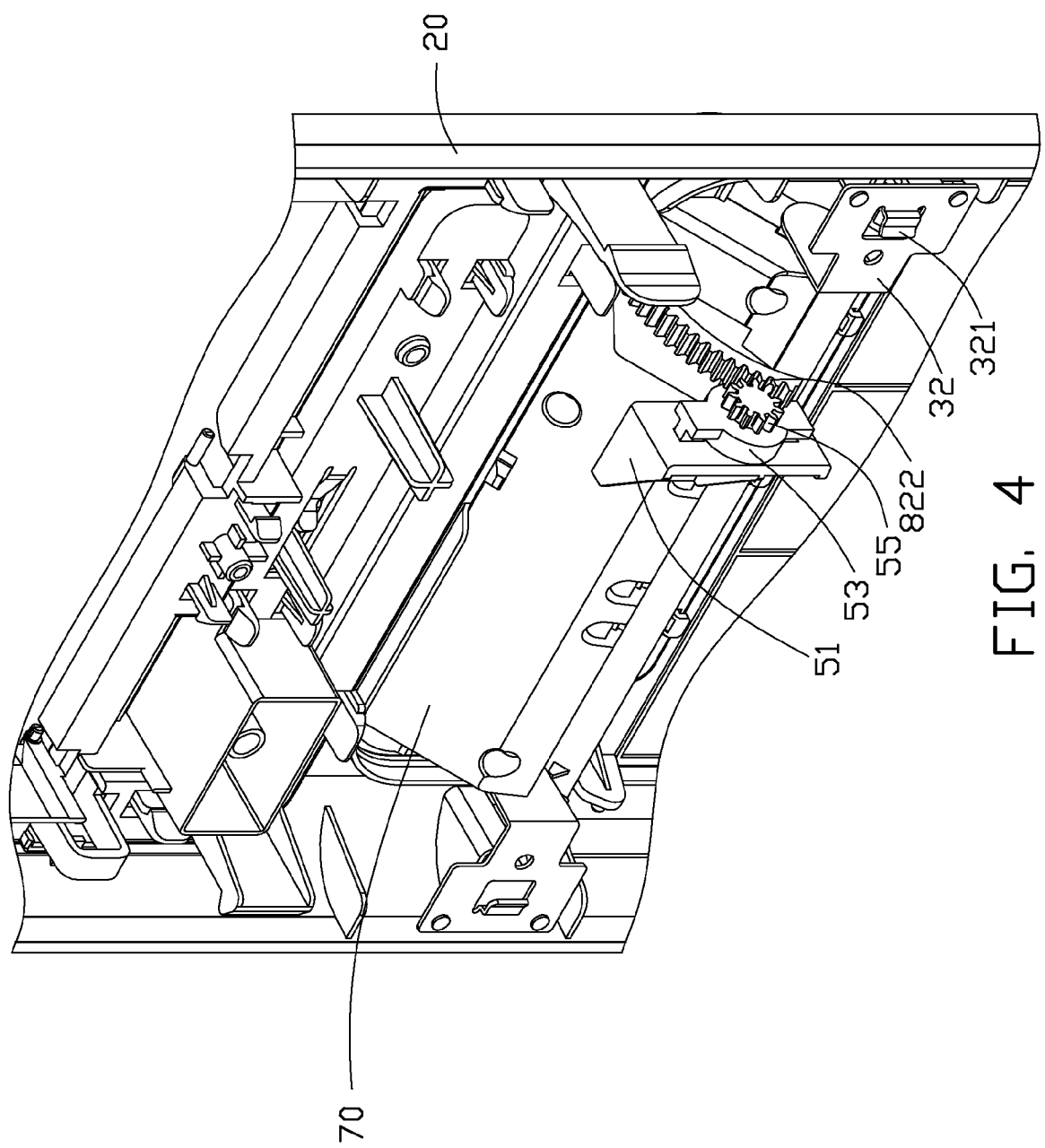
FIG. 4 is an assembled, isometric view of FIG. 1, showing the I/O module in an open state.
Figure 5:
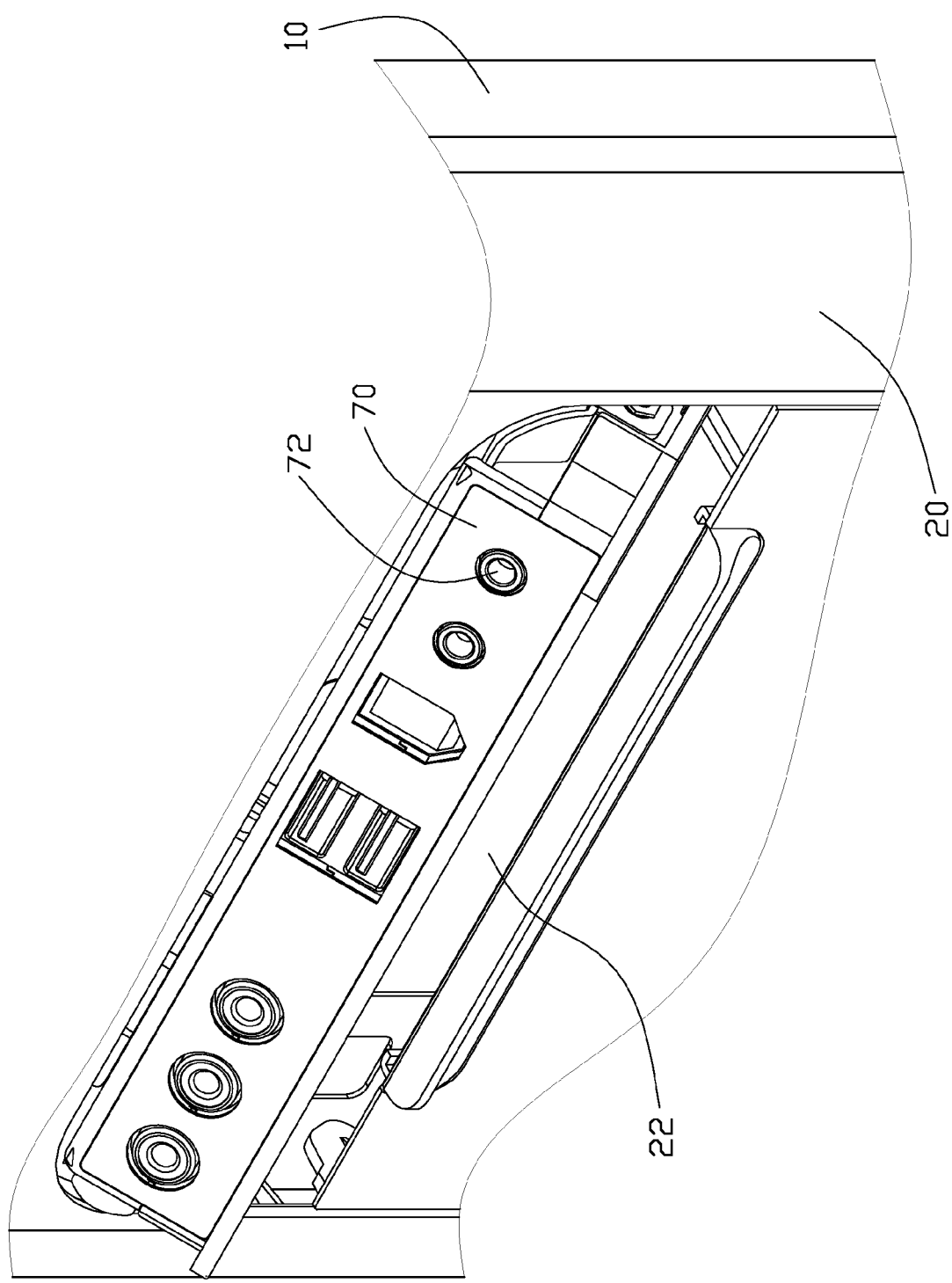
FIG. 5 is similar to FIG. 4, but an inverted view.

Referring to FIGS. 3 to 5, in use, to close the I/O module 70, the I/O module 70 is pushed to rotate about the shafts 342 of the mounting brackets 30. The gear rack 80 moves with the I/O module 70, and the damping gear 55 is rotated by the engagement with the gear rack 80. A top of the I/O module 70 moves towards the inner chassis 10, and a bottom of the I/O module 70 moves towards an outer side of the inner chassis 10. Therefore, the resilient members 60 are deformed. When the I/O module 70 moves to a closed position where the I/O interfaces 72 are hidden and the I/O module 70 is substantially received in the housing portion 11 of the inner chassis 10, the tongue 74 of the I/O member 70 actuates the actuator 423 of the locking member 42, as a result the clamping portions 421 closes towards each other to catching the wedged portions 741. Therefore, the I/O module 70 can be held at the closed position.

To expose the I/O interfaces 72, an upper portion of the I/O module 70 is pushed inwards, resulting in the tongue 74 actuating the actuator 423 of the locking member 42. Therefore, the clamping portions 421 separate from each other to loose the wedged portions 741 of the tongue 74. The I/O module 70 is pivoted out by an action of the resilient elements 40 restoring. The gear rack 80 moves with the I/O module 70, and the damping gear 55 is rotated by the engagement with the gear rack 80. Therefore, the I/O module 70 moves smoothly on the effect of a damping force of the damping gear 55. Therefore, the plurality of I/O interfaces 72 of the I/O module 70 is exposed.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer enclosure comprising:
   an inner chassis;
   an input/output (I/O) module defining a plurality of I/O interfaces, mounted to the inner chassis, and pivotable relative to the inner chassis between a closed position where the plurality of I/O interfaces is unexposed, and an open position where the plurality of I/O interfaces is exposed;
   a latching unit attached to the inner chassis to latch the I/O module at the closed position;
   at least one resilient member connected between the I/O module and the inner chassis to pivot the I/O module from the closed position to the open position;
   a gear rack attached to the I/O module; and
   a damping gear assembly attached to the inner chassis and engaged with the gear rack, wherein the pivotal movement of the I/O module is restrained and smoothened by the damping gear assembly.

2. The computer enclosure of claim 1, wherein the inner chassis defines at least one hooking hole, the I/O module comprises at least one retaining portion, a first end of each of said at least one resilient member is engaged in a corresponding hooking hole of the inner chassis, and a second end of each of said at least one resilient member is engaged with a corresponding retaining portion of the I/O module, said at least one resilient member biases the I/O module to pivot from the close position to the open position in response to the I/O module being unlatched.

3. The computer enclosure of claim 2, wherein the inner chassis defines at least one opening correspondingly for said at least one resilient member passing through, the inner chassis forms a fixing support adjacent to each opening, the hooking hole is defined in the fixing support.

4. The computer enclosure of claim 2, further comprising two mounting brackets fixed to the inner chassis, wherein each of the mounting brackets comprises a shaft, the I/O module defines two pivot holes pivotably receiving the shafts of the corresponding mounting brackets.

5. The computer enclosure of claim 4, wherein the plurality of I/O interfaces is defined in a first surface of the I/O module, said at least one retaining portion of the I/O module is arranged adjacent to a second surface perpendicular to the first end of the I/O module, the two pivot holes of the I/O module are defined in opposite ends of the I/O module, and arranged between the first surface and said at least one retaining portion.

6. The computer enclosure of claim 1, wherein the damping gear assembly comprises a mount fixed to the inner chassis, a base retained to the mount, and a damping gear rotatably installed to the base, the gear rack comprises a mounting portion secured to the I/O module, and an engaging portion comprising a plurality of teeth to mesh with the damping gear.

7. The computer enclosure of claim 6, wherein the inner chassis defines an interference-avoiding hole, the engaging portion of the gear rack passes through the interference-avoiding hole to engage with the damping gear.

8. The computer enclosure of claim 6, wherein the engaging portion of the gear rack is curved and fixed to the I/O module, the plurality of teeth is formed at an arc rim of the engaging portion.

9. The computer enclosure of claim 6, wherein the mount of the damping gear assembly defines two fixing holes, the base of the damping gear assembly comprises two hooks to be retained in the fixing holes of the mount.

10. The computer enclosure of claim 1, wherein the I/O module comprises a tongue extending from a surface of the I/O module, the latching unit comprises a frame retained to the inner chassis, and a locking member to engage with the tongue of the I/O module.

11. The computer enclosure of claim 10, wherein the locking member comprises two clamping portions to sandwich the tongue of the I/O module therebetween.

12. The computer enclosure of claim 1, wherein said at least one resilient member comprises two coil springs.

13. An input/output (I/O) module assembly of an inner chassis, the I/O module comprising:
- an I/O module defining a plurality of I/O interfaces, wherein the I/O module attached to the inner chassis and movable relative to the inner chassis between a closed position where the plurality of I/O interfaces is unexposed, and an open position where the plurality of I/O interfaces is exposed;
- a locking member attached to the inner chassis to latch the I/O module at the closed position;
- at least one coil spring connected between the I/O module and the inner chassis, wherein the I/O module is driven towards the closed position by a restoring force of said at least one coil spring; and
- a damping mechanism deposed between the I/O module and the inner chassis, to smoothen the movement of the I/O module.

14. The I/O module assembly of claim 13, wherein the damping mechanism comprises a damping gear attached to the inner chassis, and a gear rack secured to the I/O module to mesh with the damping gear.

15. The I/O module assembly of claim 13, wherein the locking member comprises two clamping portions facing towards each other, the I/O module comprises a tongue extending from a surface of the I/O module, to be held between the clamping portions of the locking member.

16. The I/O module assembly of claim 15, wherein the locking member further comprises an actuator to drive the clamping portions to close towards or separate away from each other in response to the tongue of the I/O module actuating the actuator.

17. The I/O module assembly of claim 13, wherein the at least one coil spring comprises two coiling springs.

18. The computer enclosure of claim 13, wherein said at least one resilient member is elongated in response to the I/O module moving to the open position.

\* \* \* \* \*